United States Patent
Tamura (10) Patent No.: US 8,041,206 B2
(45) Date of Patent: Oct. 18, 2011

(54) IMAGING APPARATUS AND METHOD FOR CONTROLLING FLASH EMISSION

(75) Inventor: Kazunori Tamura, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/569,693

(22) Filed: Sep. 29, 2009

(65) Prior Publication Data

US 2010/0080549 A1  Apr. 1, 2010

(30) Foreign Application Priority Data

Sep. 30, 2008  (JP) ................. 2008-252236

(51) Int. Cl.
 *G03B 15/05* (2006.01)
(52) U.S. Cl. ...................... 396/157; 348/371
(58) Field of Classification Search .................. 396/157, 396/222, 234, 247; 348/296–297
 See application file for complete search history.

(56) References Cited

U.S. PATENT DOCUMENTS

| | | | | |
|---|---|---|---|---|
| 4,307,949 | A * | 12/1981 | Takazawa et al. | 396/67 |
| 7,129,983 | B2 * | 10/2006 | Rantanen et al. | 348/371 |
| 7,589,784 | B2 * | 9/2009 | Chiba et al. | 348/371 |
| 7,675,569 | B2 * | 3/2010 | Maeda | 348/371 |
| 2001/0012449 | A1 * | 8/2001 | Kawabe et al. | 396/234 |
| 2007/0146529 | A1 * | 6/2007 | Suzuki | 348/333.01 |

FOREIGN PATENT DOCUMENTS

JP  2000-196951 A  7/2000

OTHER PUBLICATIONS

EXIF Specification version 2.2, dated Apr. 2002. Relevant sections.*

* cited by examiner

*Primary Examiner* — Clayton E LaBalle
*Assistant Examiner* — Leon W Rhodes, Jr.
(74) *Attorney, Agent, or Firm* — Birch, Stewart, Kolasch & Birch, LLP (57) ABSTRACT

An imaging apparatus includes: flash driving means for driving a flash during a set preliminary emission period and a set main emission period; and an image sensor constituted by a plurality of photoelectric converting elements which are arranged in a matrix and capable of being accessed randomly. The charge accumulation initiation timing and the charge accumulation cessation timing of the photoelectric converting elements are controlled line by line or pixel by pixel. The imaging apparatus forms images employing pixel signals output from the photoelectric converting elements, and extracts pixel signals output from photoelectric converting elements in which charge accumulation is initiated prior to the preliminary emission period and ceased after the preliminary emission period. An emission amount to be employed during the main emission period is determined by executing predetermined calculations based on the extracted pixel signals. Main emission of flash is performed with the determined emission amount.

5 Claims, 9 Drawing Sheets

| 1 | 1 | 1 | 1 | 1 | 1 | 1 | 1 |
|---|---|---|---|---|---|---|---|
| 1 | 2 | 2 | 2 | 2 | 2 | 2 | 1 |
| 1 | 2 | 5 | 5 | 5 | 5 | 2 | 1 |
| 1 | 2 | 5 | 10 | 10 | 5 | 2 | 1 |
| 1 | 2 | 5 | 10 | 10 | 5 | 2 | 1 |
| 1 | 2 | 5 | 5 | 5 | 5 | 2 | 1 |
| 1 | 2 | 2 | 2 | 2 | 2 | 2 | 1 |
| 1 | 1 | 1 | 1 | 1 | 1 | 1 | 1 |

| 1 | 1 | 1 | 1 | 1 | 1 | 1 | 1 |
|---|---|---|---|---|---|---|---|
| 1 | 2 | 2 | 2 | 2 | 2 | 2 | 1 |
| 1 | 2 | 5 | 5 | 5 | 5 | 2 | 1 |
| 1 | 2 | 5 | 10 | 10 | 5 | 2 | 1 |
| 1 | 2 | 5 | 5 | 5 | 5 | 2 | 1 |
| 1 | 2 | 2 | 2 | 2 | 2 | 2 | 1 |
| 1 | 1 | 1 | 1 | 1 | 1 | 2 | 1 |
| 1 | 1 | 1 | 1 | 1 | 1 | 1 | 1 |

FIG.12

| 1 | 2 | 5 | 5 | 5 | 5 | 2 | 1 |
|---|---|---|---|---|---|---|---|
| 1 | 2 | 5 | 10 | 10 | 5 | 2 | 1 |
| 1 | 2 | 5 | 10 | 10 | 5 | 2 | 1 |
| 1 | 2 | 5 | 5 | 5 | 5 | 2 | 1 |
| 1 | 2 | 2 | 2 | 2 | 2 | 2 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG.13

IMAGING APPARATUS AND METHOD FOR CONTROLLING FLASH EMISSION

BACKGROUND OF THE INVENTION

1. Field of the Invention

The present invention is related to an imaging apparatus equipped with a flash photography function, and a method for controlling flash. More specifically, the present invention is related to an imaging apparatus that obtains images with an imaging element which is capable of controlling an initiation timing and a cessation timing of charge accumulation in pixel units, and a method, and optimizes flash emission amounts utilizing the images, and a method for optimizing flash emission amounts.

2. Description of the Related Art

Recently, imaging elements which are provided in digital cameras and the like are transitioning form CCD image sensors to CMOS image sensors. CMOS image sensors can be manufactured by a process similar to that for manufacturing CMOS LSI's. Therefore, providing built in circuits other than image sensors into the same chip is facilitated, and CMOS image sensors are suited for use as so called "systems on chips". In addition, CMOS image sensors have advantages over CCD image sensors in that there is less influence by noise (smearing) during signal transfer, and the number of power sources can be reduced.

On the other hand, CMOS image sensors cannot output signals from all pixels simultaneously due to their structures, unlike CCD image sensors. Therefore, signal readout is performed line by line or pixel by pixel. At this time, charge accumulation is initiated pixels from the point in time that signals are output therefrom. Therefore, the charge accumulation initiation timing and the charge accumulation completion timing of each pixel differ according to the signal output timing thereof.

Meanwhile, there is a known method for controlling flash of digital cameras, in which flash is emitted prior to actual photography (hereinafter, referred to as "preliminary emission"), and an image obtained during the preliminary emission is utilized to optimize flash emission during actual photography (hereinafter, referred to as "main emission"). This method is effective when the imaging element of the digital camera is a CCD, but not suited for use in the case that the imaging element is a CMOS image sensor, in which the charge accumulation initiation/completion timings are different among pixels. For this reason, digital cameras which are equipped with CMOS image sensors are further provided with light adjusting sensors, and flash is controlled based on data obtained by the light adjusting sensors.

Japanese Patent No. 3639734 discloses a method, in which flash emission is controlled by utilizing images obtained by a CMOS image sensor. This document proposes a method in which the timing of preliminary emission is adjusted at the factory which manufactures digital cameras, such that preliminary emission is performed during a period in which pixels within a specific block are accumulating charges. Then, the signals which are read out from the specific block are employed to control main emission.

The method disclosed in Japanese Patent No. 3639734 is that which reads out signals from the specific block at the preliminary emission timing, as described in paragraphs 0028 through 0030. In this method, it is necessary to control readout operations depending on whether preliminary emission is performed. However, there is a possibility that frequent switching of control methods will lead to problems such as operating errors, which is not preferable. In addition, preliminary emission and optimization of actual flash emission amounts are performed after a shutter release button is depressed, and therefore high speed processing is required. Therefore, complex processes that accompany frequent switching of control methods is not preferable from the viewpoint of processing time as well.

SUMMARY OF THE INVENTION

The present invention has been developed in view of the foregoing circumstances. It is an object of the present invention to provide a method for optimizing the amount of flash emission without complex readout control even in cases that shutter speed is high (that is, exposure time is short), as a method for controlling flash emission in an imaging apparatus equipped with a CMOS sensor.

The imaging apparatus of the present invention comprises: an image sensor constituted by a plurality of photoelectric converting elements which are arranged in a matrix and capable of being accessed randomly; and control means for controlling the charge accumulation initiation timing and the charge accumulation cessation timing of the photoelectric converting elements line by line or pixel by pixel. The imaging apparatus of the present invention is further equipped with: image forming means for forming images employing pixel signals which are output from the photoelectric converting elements; flash driving means for driving a flash during a set preliminary emission period and a set main emission period; and flash emission amount calculating means. The flash emission calculating means extracts image signals output from pixel signals which are output from photoelectric converting elements in which charge accumulation is initiated prior to the preliminary emission period and charge accumulation is ceased after the preliminary emission period, and executes predetermined calculations based on the extracted pixel signals, to determine a flash emission amount to be employed during the main emission period.

The method of the present invention is a method for controlling the flash of the imaging apparatus of the present invention. The flash is operated according to the following steps. First, the flash is emitted for a predetermined preliminary emission period, and an image is formed employing pixel signals output from the photoelectric converting elements. Next, pixel signals which are output from photoelectric converting elements, in which charge accumulation is initiated prior to the preliminary emission period and charge accumulation is ceased after the preliminary emission period, are extracted. Thereafter, predetermined calculations are executed based on the extracted pixel signals to determine a flash emission amount to be employed during the main emission period, to set the emission amount. Then, main emission of the flash is performed at the set flash emission amount.

In imaging elements such as CMOS image sensors, there are lines or pixels that cannot receive light reflected from subjects during preliminary emission, when the duration from charge accumulation initiation to charge accumulation cessation is short, that is, when the shutter speed is high. In this respect, the imaging apparatus and the method for controlling flash of the present invention utilize only pixel signals that received all of the light reflected from subjects during preliminary emission when calculating the amount of flash emission during main emission. Therefore, the emission amount during main emission can be set to an appropriate value even in cases that the shutter speed is high.

It is preferable for parameters to be employed in the predetermined calculations to be determined based on at least one of the number of extracted pixel signals (the size of the image region to be utilized in the calculations) and the positions of pixels that correspond to the extracted pixel signals (the positions of the image region to be utilized for the calculations within the image as a whole). In this case, uniform calculation results can be obtained regardless of the number or positions of the pixel signals which are extracted in the calculating process for obtaining the flash emission amount.

It is preferable for the imaging apparatus of the present invention to further comprise: display control means for outputting the images formed by the image forming means and markers that indicate pixels that correspond to the extracted pixel signals to a predetermined screen. In this case, users will be able to confirm the range of pixel signals to be utilized in the calculation of flash emission amounts on a monitor.

It is preferable for the imaging apparatus of the present invention to further comprise: warning means for outputting a predetermined warning in the case that pixel signals which are not utilized for the predetermined calculations are present. In this case, the output of the warning will inform users that the range of image signals which are employed to calculate the emission amount is limited, and can adjust the shutter speed as necessary.

It is preferable for the imaging apparatus of the present invention to further comprise: means for recording the images formed by the image forming means into a predetermined recording medium, and for recording data that specifies the extracted pixel signals as data attached to the images. In this case, users can read out the data from the recording medium along with the images, and confirm the data. In addition, in cases that image files are transferred to a personal computer and image processes are administered thereon, the data can be utilized in the image processes.

DESCRIPTION OF THE PREFERRED EMBODIMENTS

Hereinafter, an SLR digital camera equipped with a flash photography function and a method for controlling the flash of the digital camera will be described as embodiments of the imaging apparatus and the control method of the present invention.

Figure 1:
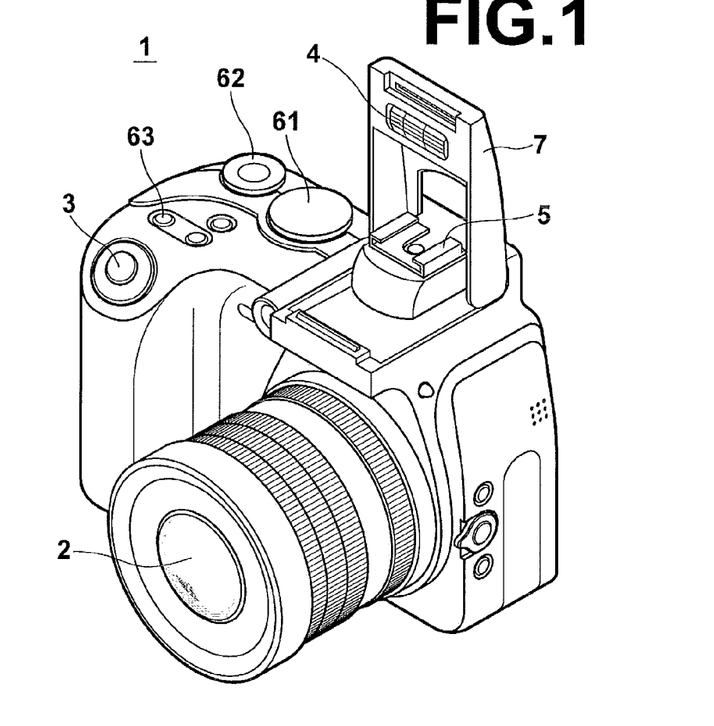
FIG. 1 is a perspective view that illustrates the outer appearance of a digital camera.

FIG. 1 is a perspective view that illustrates the outer appearance of a digital camera 1. As illustrated in FIG. 1, an imaging lens 2 is provided on the front surface of the digital camera 1. A shutter release button 3; a flash 4; a hot shoe 5, which is a mounting port for peripheral equipment; and setting/operating buttons 6 that include a mode dial 61 for performing various setting operations; a command dial 62; and a flash button 63 are provided on the upper surface of the digital camera 1.

The shutter release button 3 is of a structure that can command two types of operations by being depressed in two steps. For example, during a photography operation that utilizes an AE (Automatic Exposure) function and an AF (Automatic Focus) function, the digital camera 1 sets an optimal exposure and an optimal focal point when the shutter release button 3 is depressed lightly (also referred as "half depression"). If the shutter release button 3 is depressed strongly (also referred to as "full depression") in this state, the digital camera initiates exposure with set conditions, then records image data obtained by the exposure corresponding to a single frame into a memory card.

The flash 4 is housed in a flash housing section 7. The flash performs emission operations accompanying second step depressions (full depressions) of the shutter release button 3. The flash housing section 7 opens upward from the camera automatically or by manual operation. FIG. 1 illustrates the flash housing section 7 in an open state.

The emission operation of the flash is determined by photography modes and flash modes which are set by a user. The photography modes include: an AUTO mode, in which all settings involved with photography operations are automatically set by the digital camera 1; a manual mode, in which all settings involved with photography operations are manually set by the user; a program auto mode; a shutter prioritizing auto mode; an aperture prioritizing auto mode; a preliminary reduced mode; a natural photo mode; and modes set for photography scenes, such as portraits, scenery, and night views. The photography mode can be set by operating the mode dial 61. The flash modes include: an automatic flash mode, in which whether it is necessary to emit flash is judged from the brightness of the surroundings; and a forced emission mode, in which flash is emitted regardless of the brightness of the surroundings. The flash mode can be set by depressing the flash button 63, and performing operations on a setting screen which is displayed on a monitor to be described later.

An external flash may be mounted onto the hot shoe 5 of the digital camera 1 in a state in which the flash housing section 7 is closed. The external flash is mechanically and electrically connected to the digital camera by being mounted onto the hot shoe 5. Thereby, the external flash performs emission operations accompanying depressions of the shutter release button 3 according to set operating modes, in the same manner as the built in flash 4. The present invention is applicable to cases in which an imaging apparatus utilizes an external flash as well as cases in which an imaging apparatus utilizes a built in flash.

Figure 2:
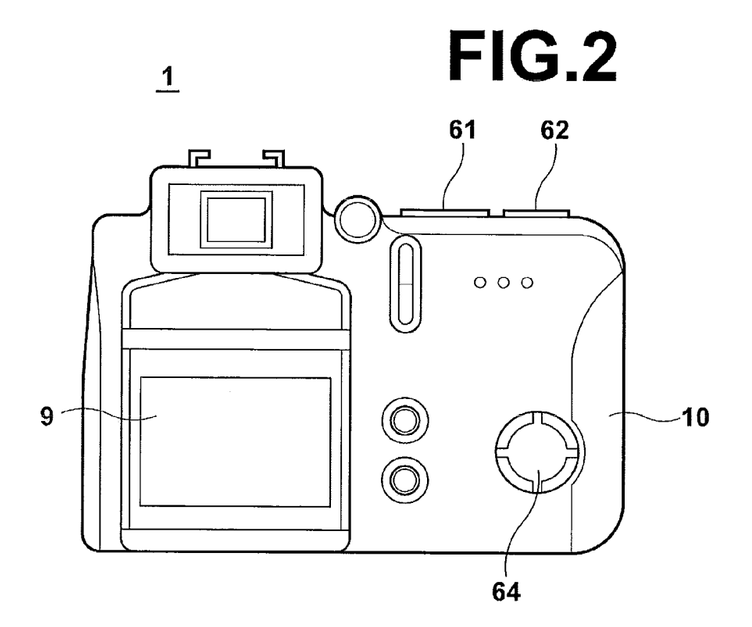
FIG. 2 is a rear view of the digital camera of FIG. 1.

FIG. 2 is a rear view of the digital camera 1. As illustrated in FIG. 2, an LCD (Liquid Crystal Display) monitor 9, a cruciform key 64 which is employed to select options during setting operations, and various setting operation buttons, such as a zoom setting button, are provided on the rear surface of the digital camera 1. A slot cover 10 provided on the side surface of the digital camera 1 is openable and closable, and a memory card slot is provided within the slot cover 10. Images which are photographed by the digital camera 1 are recorded into a recording medium such as an xD picture card loaded in the memory card slot.

Figure 3:
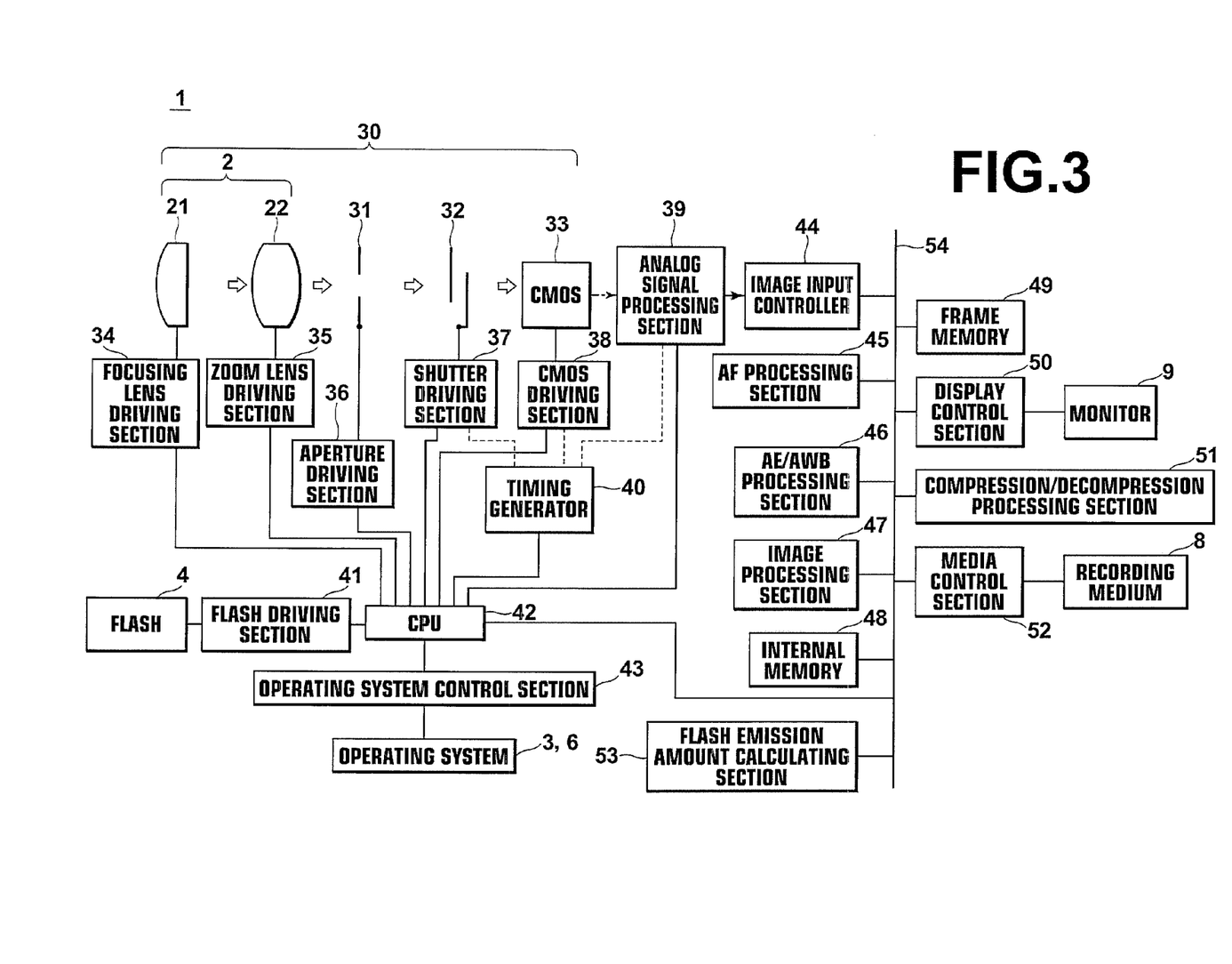
FIG. 3 is a diagram that illustrates the inner structure of the digital camera of FIG. 1.

FIG. 3 is a diagram that illustrates the inner structure of the digital camera 1. As illustrated in FIG. 3, the digital camera 1 is equipped with a CPU 42 and an internal memory 48, in which various control programs for controlling photography operations and various setting values are stored. In addition, the digital camera 1 is equipped with an operating system control section 43, into which data is input from an operating system including the shutter release button 3 and the various setting/operating buttons 6. The CPU 42 sends and receives signals with the components of the digital camera 1 either directly or via a system bus 54. The CPU 42 controls updates of set values stored in the internal memory 48 according to operation data input from the operating system control section 43 and control programs stored in the internal memory 48. The CPU 42 also functions to control the operations of various components of the digital camera 1 to be described hereinafter.

The digital camera 1 is equipped with: imaging lenses 2; an aperture 31; a shutter 32; a CMOS image sensor 33; and drive sections for driving and controlling these components, as an imaging system 30. The imaging lenses 2 are constituted by a focusing lens 21 and a zoom lens 22. The focusing lens 21 and the zoom lens 22 are driven by a focus lens driving section 34 and a zoom lens driving section 35, which are respectively constituted by a motor and a motor driver, so as to be movable in the direction of the optical axes thereof. The focusing lens driving section 34 drives the focusing lens 21 based on focus driving amount data output from an AF processing section 45 to be described later. The zoom lens driving section 35 controls the driving of the zoom lens 22 based on operation amount data of a zoom lever.

The aperture 31 is driven by an aperture driving section 36 constituted by a motor and a motor driver. The aperture driving section 36 adjusts how much the aperture 31 is opened based on aperture value data output from an AE/AWB processing section 46 to be described later.

The shutter 32 is a mechanical shutter, and is driven by a shutter driving section 37 constituted by a motor and a motor driver. The shutter driving section 37 controls the opening and closing of the shutter 32 according to a signal which is generated when the shutter release button 3 is depressed, and also according to shutter speed data output from the AE/AWB processing section 46.

The CMOS image sensor 33, which is an imaging element, is provided toward the rear of the optical system described above. The CMOS image sensor 33 has a light receiving surface, in which a plurality of photoelectric converting elements are arranged in a matrix. A microlens array for focusing light onto each pixel, and a color filter array, in which R, G, and B filters are arranged in a regular manner, are provided in front of the photoelectric converting surface. Light which has passed through the optical system is focused onto the light receiving surface, and photoelectrically converted such that charges are accumulated in each photoelectric converting element.

The accumulated charges are amplified by an amplifying element which is provided behind each photoelectric converting element. The charges are output as analog image signals one line at a time, synchronized with vertical transfer clock signals and horizontal transfer clock signals provided by a CMOS driving section 38.

In the following description, each element constituted by a photoelectric converting element and an amplifying element corresponding to a single pixel will be referred to as a unit element. The topmost line of the light receiving surface will be referred to as line 1, and subsequent lines will be referred to as line 2, line 3, . . . line N (N is the total number of lines).

Figure 4:
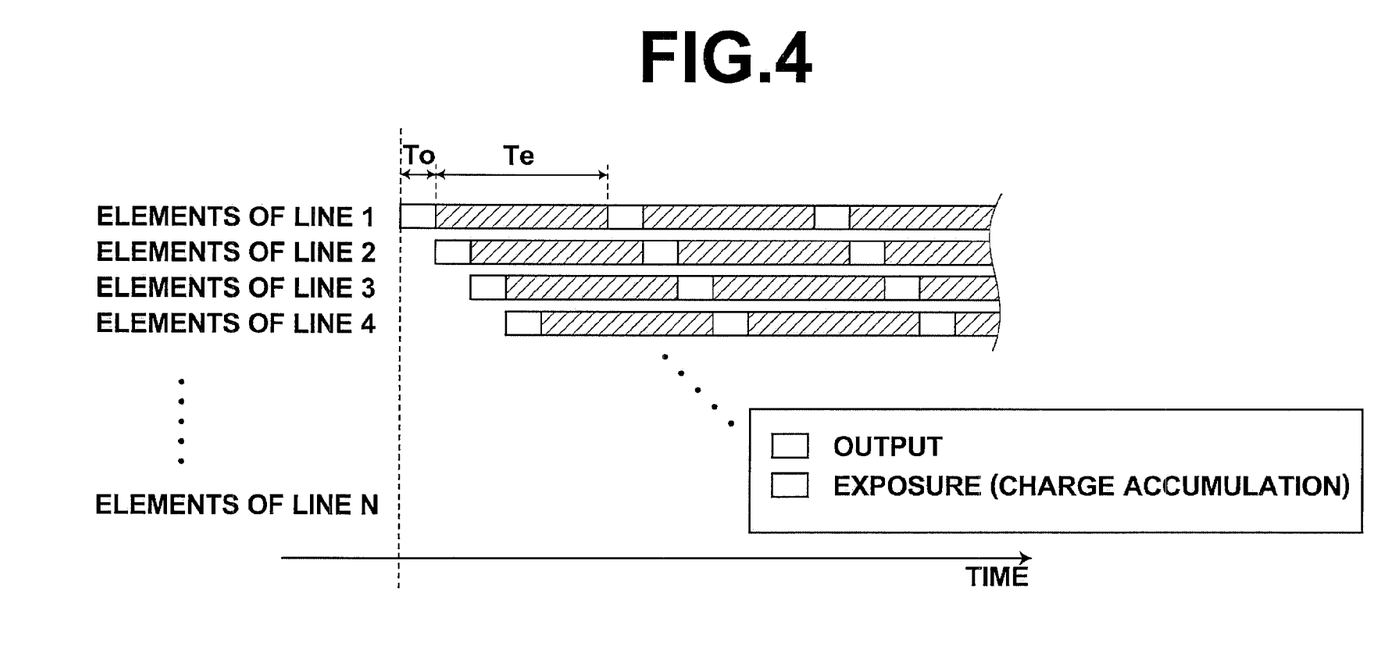
FIG. 4 is a chart that illustrates exposure operations and output operations of unit elements.

FIG. 4 is a chart that illustrates the operations of unit elements that constitute each line of the CMOS image sensor 33. The horizontal axis in the chart of FIG. 4 represents time. As illustrated in FIG. 4, when charges which are accumulated in the unit elements are output in order from line 1 and the amount of time required to output charges for a single line is To, the time required to output a single frame becomes To·N.

In CCD's, which were conventionally used as imaging elements, all unit elements initiate a next exposure operation (accumulation of charges) simultaneously after output of a single frame is complete. In contrast, each unit element of a CMOS image sensor initiates accumulation of charges immediately after charges accumulated therein are output. For this reason, it is possible to control the timing at which each line or each unit element of a CMOS image sensor initiates accumulation of charges, by controlling the timing at which charges are output. If the output timings are controlled to read out signals in units of lines, the exposure periods of unit elements that constitute each line are shifted by an amount of time To, as illustrated in FIG. 4.

The amount of time To required to output charges is determined by the specifications (performance) of each device, and is stored in the internal memory 48. Meanwhile, the charge accumulation period, that is, an amount of exposure time Te, is controlled by electronic shutter drive signals which are output by the CMOS driving section 38. The CMOS driving section 38 determines the exposure time Te based on a shutter speed obtained by the AE/AWB processing section 46 or based on a shutter speed set by the setting/operation buttons 6. Clock control is exerted such that each unit element outputs charges when the exposure time Te elapses.

A description will be given with reference to FIG. 3. Analog signals which are output from the CMOS image sensor 33 are input into an analog signal processing section 39. The analog signal processing section 39 is constituted by: a correlated double sampling (CDS) circuit for removing noise from the analog image signals; an automatic gain controller (AGC) for adjusting the gain for the analog image signals; and an A/D converter (ADC) for converting the analog image signals to digital image data. The analog signals input into the analog signal processing section 39 are converted into CCD-RAW data having RGB density values for each pixel by the above circuits.

A timing generator 40 generates timing signals. The timing signals are input to the shutter driving section 37, the CMOS driving section 38, and the analog signal processing section 39, to synchronize the operation of the shutter release button 3, the opening and closing of the shutter 32, readout of charges from each line or each pixel of the CMOS image sensor 33, and the processing by the analog signal processing section 39.

An image input controller 44 organizes the digital data input from the analog signal processing section 39 into frame units, and writes the digital data in a frame memory 49. That is, in the present embodiment, the analog signal processing section 39 and the image input controller 44 function as an image forming means.

The frame memory 49 is a memory used as workspace for various types of digital image processes (signal processing) on the image data, which will be described later, and comprises an SDRAM (Synchronous Dynamic Random Access Memory) that carries out data transfer in synchronization with a bus clock signal of a predetermined period, for example.

A display control section 50 functions to display the image data stored in the frame memory 49 as a through the lens image on the monitor 9, and to display image data stored in a recording medium 8 in a playback mode. Note that the through the lens image is continuously obtained by the CMOS image sensor 33 at predetermined intervals when a photography mode is selected.

The AF processing section 45 and the AE/AWB processing section 46 determine photography conditions based on a first preliminary image. The first preliminary image is obtained by the CMOS image sensor 33 when the CPU 42 detects a half depression operation of the shutter release button 3, and is an image which is stored in the frame memory 49 via the analog signal processing section 39 and the image input controller 44.

The AF processing section 45 detects a focusing position based on the first preliminary image, and outputs focusing drive amount data (AF processing). A passive method, in which a characteristic that a focus evaluation value (contrast value) of images increases in a focused state is utilized, may be applied to detect the focusing position.

The AE/AWB processing section 46 measures the luminance of subjects based on the first preliminary image, and determines exposure conditions such as an ISO sensitivity, an aperture value, an shutter speed and the like, based on the luminance. The AE/AWB processing section 46 then outputs ISO sensitivity data, aperture value data, and shutter speed data as exposure setting values (AE processing). At the same time, the AE/AWB processing section 46 automatically adjusts white balance during photography (AWB processing). Note that the exposure and white balance may be set by manual operations input by a photographer, if the photography mode is set to manual mode. In addition, even in the case that the exposure and white balance are set automatically, a photographer may input commands through the operating system to manually adjust the exposure and white balance.

An image processing section 47 administers image quality enhancement processes such as gradation correction, sharpness correction, and color correction on image data of a final image. The image processing section 47 also administers YC processes to convert the CCD-RAW data into YC data comprising Y data as a luminance signal, Cb data as a blue color difference signal, and Cr data as a red color difference signal. The final image is an image based on the image data stored in the frame memory 49 via the analog signal processing section 39 and the image input controller 44 after input of the analog image data from the CMOS image sensor 33, in response to a full depression of the shutter button 3. The maximum number of pixels of the final image is determined by the number of the pixels of the CCD 58. However, the number of pixels to be recorded can be changed by the user, by setting the image quality to fine or normal, for example. The number of pixels of the through the lens image and the preliminary image may be less than that of the final image, and may be 1/16 that of the final image, for example.

A compression/decompression section 51 carries out compression processes to a format such as JPEG on the image data, which has been subjected to the image enhancement processes and the like by the image processing section 47, and generates an image file. Accompanying information is added as tags to the image file, based on the Exif format. The compression/decompression section 51 also reads compressed images files from the recording medium 8 in the playback mode, and administers decompression processes thereon. Image data, on which the decompression processes have been administered, are displayed on the monitor 9.

A media control section 52 carries out image-file reading and writing from and to the recording medium 8.

The flash 4 is driven by the flash driving section 41 to emits light when the CPU 42 detects a full depression operation of the shutter release button 3 in a state that the photography mode or the flash mode is set to a mode in which flash is to be emitted. Flash emission is performed a total of two times, once for preliminary emission and once for main emission. Flash emission is controlled by the flash driving section 41, the CPU 42, and a flash emission amount calculating section 53.

The flash emission amount calculating section 53 determines the amount of flash to be emitted during main emission, based on a second preliminary image and a third preliminary image. The second preliminary image is obtained by the CMOS image sensor 33 prior to preliminary emission of flash when the CPU 42 detects a full depression operation of the shutter release button 3, and is an image represented by image data which is stored in the frame memory 49 via the analog signal processing section 39 and the image input controller 44. The third preliminary image is obtained by the CMOS image sensor 33 during the preliminary emission of flash, and is an image represented by image data which is stored in the frame memory 49.

Figure 5:
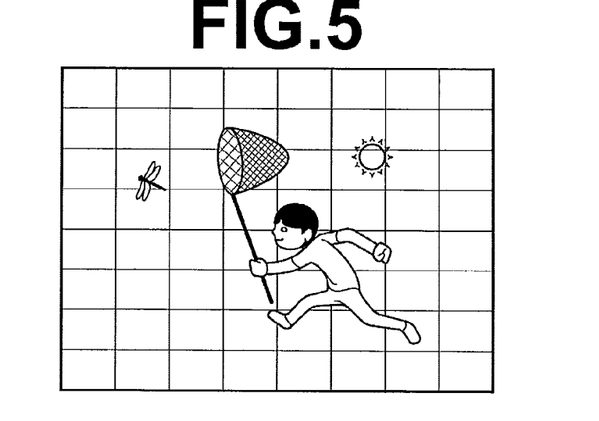
FIG. 5 illustrates an example in which an image is divided into 8×8 block regions.

In the present embodiment, the flash emission amount calculating section 53 determines the amount of flash to be emitted during main emission based on the brightness of the central portion of an image. The flash emission amount calculating section 53 reads out the second preliminary image from the frame memory 49, and divides the second preliminary image into a plurality of block regions. FIG. 5 illustrates an example in which an image is divided into 8×8 block regions.

Figure 6:
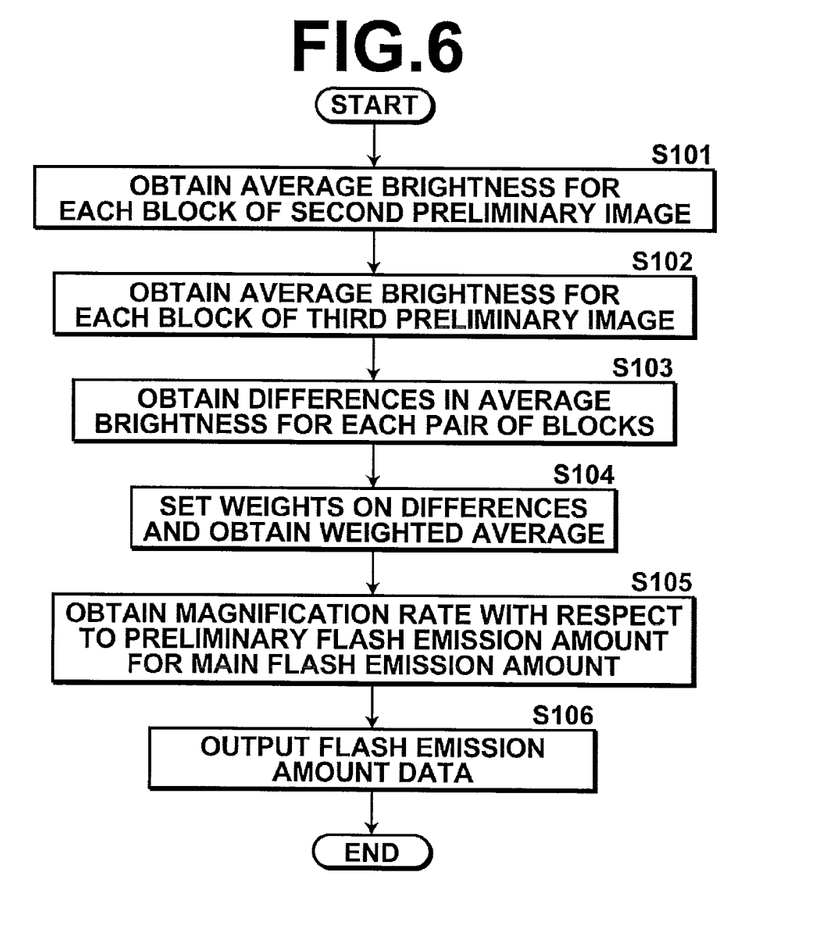
FIG. 6 is a flow chart that illustrates the steps of a process performed by a flash emission amount calculating section.

FIG. 6 is a flow chart that illustrates the steps of a process performed by the flash emission amount calculating section 53. As illustrated in FIG. 6, the flash emission amount calculating section 53 obtains average brightness values for each block within a second preliminary image (step S101). Specifically, the second preliminary image, which is an RGB image, is converted to a YCC image, to obtain brightness values for each pixel. Then, the average brightness values of pixels in each block are calculated. Average brightness values are obtained for each block within a third preliminary image in the same manner (step S102). Then, differences among the average brightness values obtained in step S102 and the average brightness values obtained in step S101 are calculated (step S103).

Figure 7:
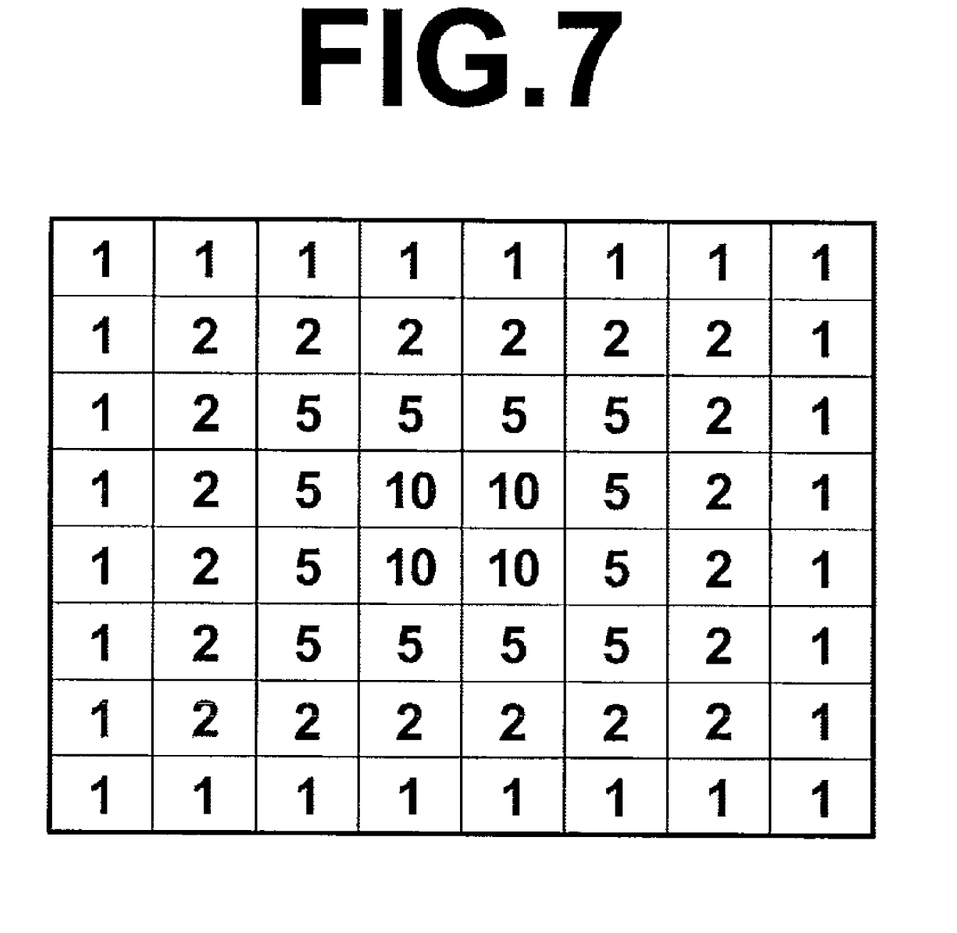
FIG. 7 is a diagram that illustrates an example of weighting coefficients assigned to blocks of an image.

Next, the flash emission amount calculating section 53 sets weights for the differences for each block which were calculated in step S103, and calculates a weighted average (step S104). Thereby, a reflected brightness E1 during preliminary emission is obtained. The weights are set higher for blocks arranged at positions closer to the center of the image, as illustrated in the example of FIG. 7. That is, the reflected brightnesses of subjects arranged at the center are caused to be more strongly reflected in the calculation results.

The flash emission amount calculating section 53 obtains a magnification rate M, which is the magnification rate of the flash emission amount during main emission with respect to that during the preliminary emission, according to Formula (1) below (step S105).

$$M=(E2-E3)/E1 \quad (1)$$

wherein E2 is a target brightness of an image to be obtained by actual photography, and E3 is the average brightness of the entire second preliminary image, which is obtained without emitting flash.

Then, data that represents the magnification rate M, or data that represents the flash emission amount to be utilized for main emission, calculated by multiplying the flash emission amount during preliminary emission by M, is output as flash emission amount data (step S106).

The flash emission amount data output from the flash emission amount calculating section 53 is provided to the flash driving section 41 via the CPU 42. The flash driving section 41 adjusts the bulb voltage and emission time of the flash 4 such that the flash emission amount during main emission becomes that indicated by the flash emission amount data, and drives the flash 4.

Note that various other methods for calculating the flash emission amount during main emission based on an image obtained without emitting flash and an image obtained during preliminary emission may be employed. For example, there is a known method for determining a flash emission amount by performing calculations with weighting placed on regions at which faces are detected, in digital cameras that have a function of detecting faces within images. The flash emission amount calculating section 53 may adopt such a known method to calculate flash emission amounts, and the process described above is merely an illustrative example.

Figure 8:
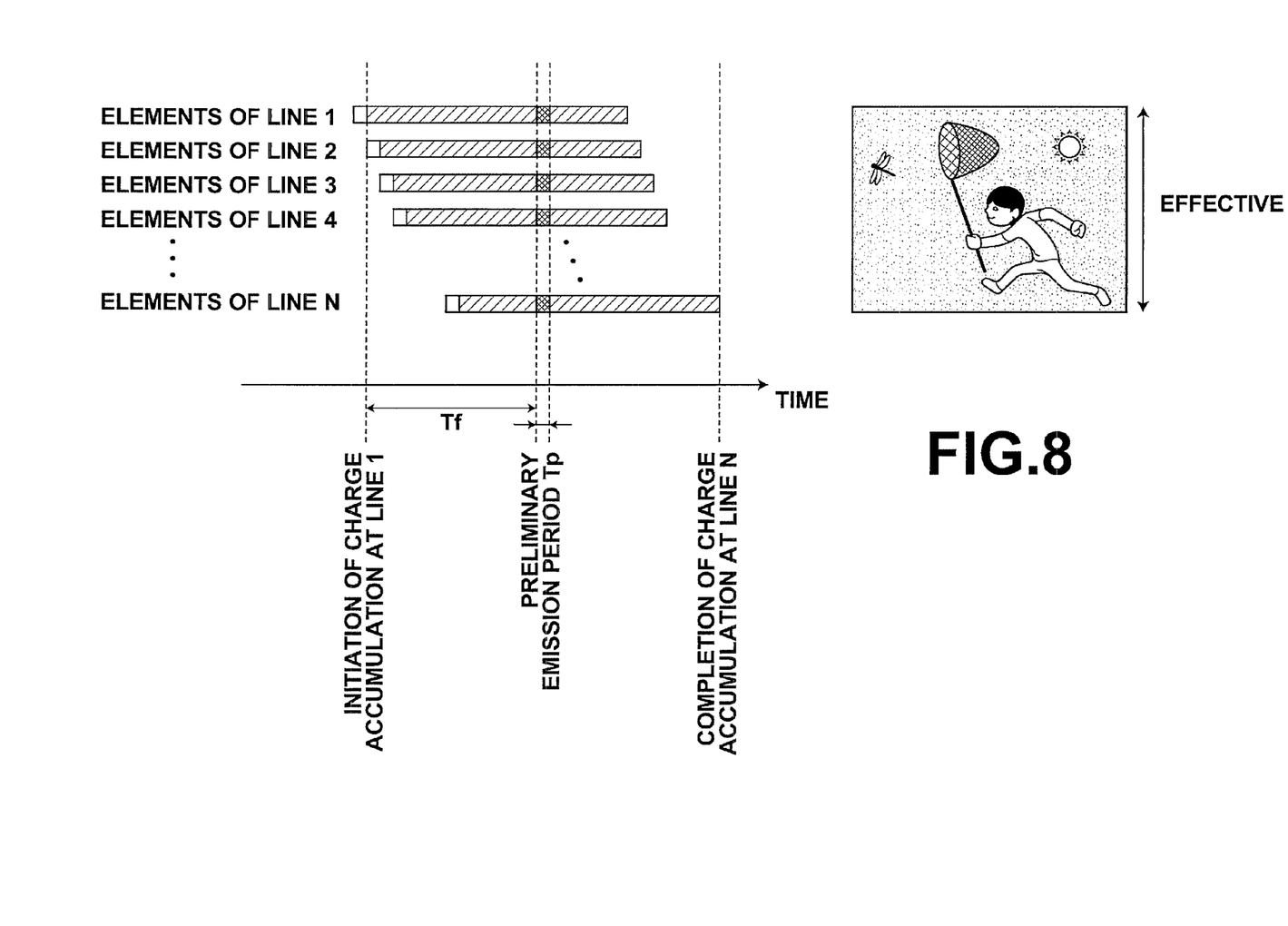
FIG. 8 is a diagram that illustrates the relationship between emission periods of a flash and the operation of a CMOS image sensor when third preliminary images are obtained with a normal shutter speed.
Figure 9:
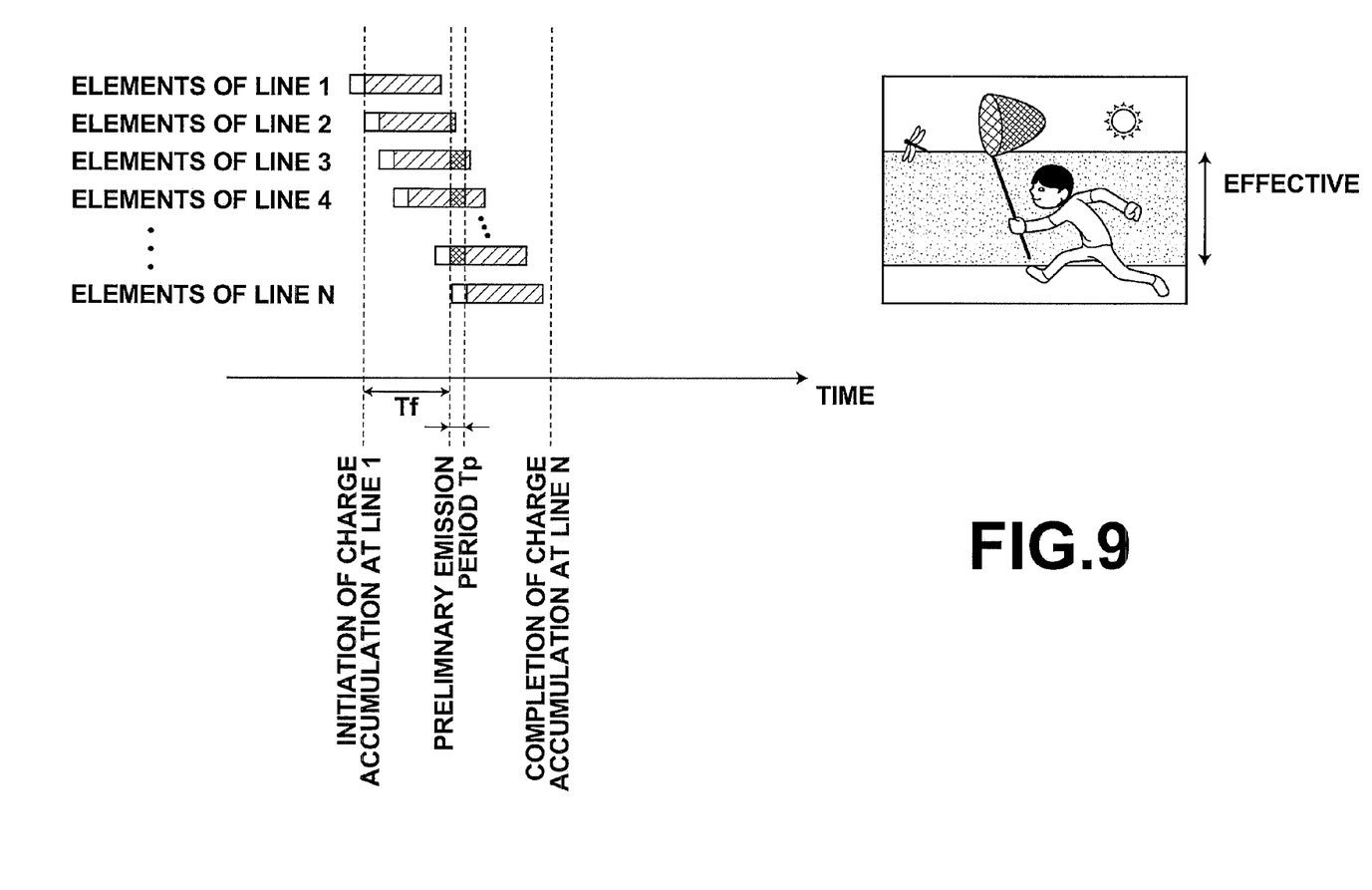
FIG. 9 is a diagram that illustrates the relationship between emission periods of a flash and the operation of a CMOS image sensor when third preliminary images are obtained with a high shutter speed.

Hereinafter, operations related to controlling the flash of the digital camera 1 will be described further. FIG. 8 and FIG. 9 are diagrams that illustrate relationships between emission periods of the flash 4 and the operation of the CMOS image sensor 33 when third preliminary images are obtained. FIG. 8 illustrates the relationship in the case that a normal (not high) shutter speed is set, and FIG. 9 illustrates the relationship in the case that a high shutter speed is set.

As illustrated in FIG. 8, the exposure time Te of the unit elements illustrated in FIG. 4 becomes sufficiently long compared to the output time To at a normal shutter speed setting. In this case, a comparatively long period during which all of the unit elements are accumulating charges is present. Accordingly, if preliminary emission is performed at a midpoint of a period beginning at a charge accumulation initiation time of line 1 and a charge accumulation completion time of line N, light reflected during the preliminary emission period is received by unit elements that constitute all lines of the CMOS image sensor 33. In other words, all of the unit elements that constitute the CMOS image sensor 33 initiate charge accumulation prior to the preliminary emission period and cease charge accumulation after the preliminary emission period. The third preliminary image is formed from pixel signals output from these unit elements.

On the other hand, when the shutter speed is high, that is, the exposure time Te is short, a period during which all of the unit elements are accumulating charges is not present, or extremely short, as illustrated in FIG. 9. For this reason, only unit pixels of a limited number of lines initiate charge accumulation prior to the preliminary emission period and cease charge accumulation after the preliminary emission period. In this case, pixel signals output from unit elements that constitute a portion of the lines of the third preliminary image do not represent light reflected during the preliminary emission period.

The flash emission amount calculating section 53 extracts only pixel signals that represent light reflected by a subject during a period that includes the preliminary emission period from the third preliminary image as effective pixel signals, and calculates the flash emission amount to be employed during the main emission period based on the effective pixel signals. Note that in the case that all of the pixel signals that constitute an image represent light reflected by a subject during a period that includes the preliminary emission period as in the case illustrated in FIG. 8, all of the pixel signals that constitute the image are extracted as effective pixel signals.

Figure 10:
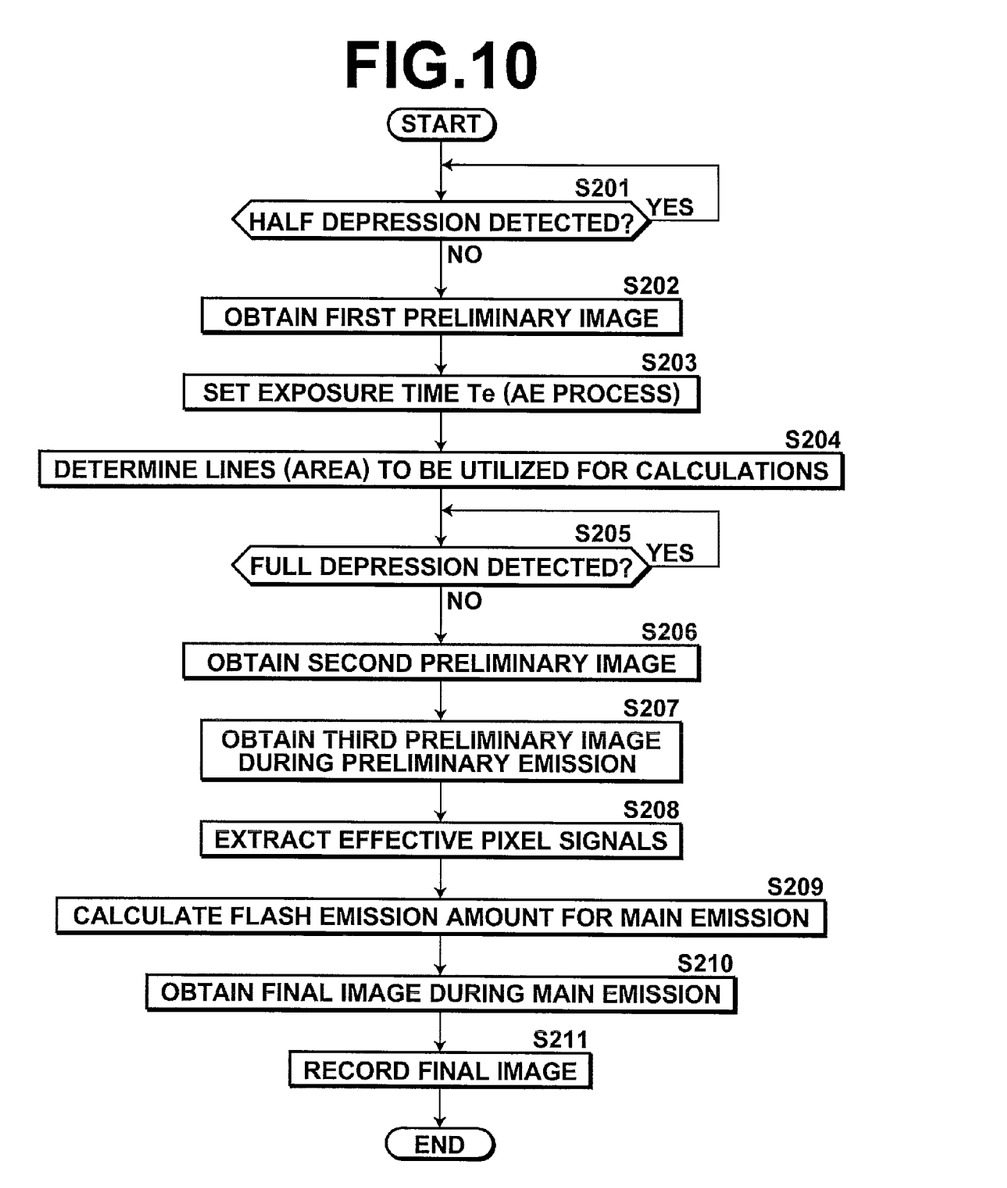
FIG. 10 is a flow chart that illustrates the operations of the digital camera of FIG. 1 related to determining the flash emission amount to be employed during main emission.

FIG. 10 is a flow chart that illustrates the operations of the digital camera 1 related to determining the flash emission amount to be employed during main emission. When a half depression operation of the shutter release button 3 is detected by the CPU 42 (step S201), a first preliminary image is obtained by commands issued by the CPU 42 and stored in the frame memory 49 (step S202). The first preliminary image is utilized by the AE/AWB processing 46 as described previously, and an exposure time Te is set by an AE process (step S203).

The flash emission amount calculating section 53 determines the lines to be employed to calculate a flash emission amount, based on the set exposure time Te, the output time To stored in the internal memory 48, an amount of time Tf between initiation of charge accumulation by unit elements of line 1 and initiation of preliminary emission, and a preliminary emission time Tp (step S204). Note that the preliminary emission time Tp is set in advance, and the preliminary emission completion timing is defined by an amount of time (Tf+Tp).

For example, the range of lines to be utilized to calculate the flash emission amount is determined by Formula (2) below.

$$L\min=(Tf+Tp-Te)/To+1, L\max=Tf/To+1 \quad (2)$$

wherein Lmin is the line having the smallest line number and Lmax is the line having the largest line number within the range of lines. Note that in the case that Lmin<1, Lmin is designated to be 1, and in the case that Lmax>N, Lmax is designated to be N. The line numbers that specify the determined range are stored in the internal memory 48.

In the case that the amount of time Tf can be calculated according to Formula (3) below, in the case that the preliminary emission initiation timing is set to be the approximate midpoint of a period beginning at a charge accumulation initiation time of line 1 and a charge accumulation completion time of line N.

$$Tf=(Te+To\cdot(N-1))/2 \quad (3)$$

Note that in the present embodiment, the CMOS image sensor 33 outputs pixel signals line by line. Alternatively, the timing at which signals are output can be different for each unit element. In the case that output control is exerted in this manner, the range may be determined not in units of lines, but in units of pixels, and specified by combinations of line and column numbers of pixels positioned at the four corners of the range.

When a full depression operation of the shutter release button 3 is detected by the CPU 42 (step S205), a second preliminary image is obtained according to commands output from the CPU 42, and stored in the frame memory 49 (step S206). Further, the flash driving section 41 initiates preliminary emission at a timing indicated by the time Tf, and a third preliminary image obtained at this time is stored in the frame memory 49 (step S207).

Next, the flash emission amount calculating section 53 reads out the second preliminary image and the third preliminary image from the frame memory 49, and extracts effective pixel signals, that is, pixel signals within the range determined by Formula (2), from the preliminary images (step S208). Thereafter, the range determined by Formula (2) is divided into a plurality of blocks, and the process of the flow chart of FIG. 6 is executed with respect to only the extracted pixel signals, to calculate the flash emission amount to be employed during main emission (step S209).

When the flash emission amount is determined, main emission is performed according to commands output from the CPU 42. and a final image obtained at this time is stored in the frame memory 49 (step S210). The final image stored in the frame memory 49 is recorded in the recording medium 8 via the media control section (step S211). The final image is compressed by the compression/decompression section 51 as necessary, and recorded as an image file of a predetermined format (an Exif file, for example).

Here, in the present embodiment, the parameters which are employed in the calculations of step S209 are adjusted on one or both of the number of extracted pixel signals and the positions of the pixels corresponding to the extracted pixel signals. As described previously, there are various methods for calculating the flash emission amount, and parameters that affect calculations vary for each method. In the present embodiment, the weighting coefficients illustrated in FIG. 7 influence the calculation results, and therefore the weighting coefficients are adjusted.

Specifically, when the number of effective pixel signals is limited, the number of blocks at which weighting is maximal is reduced as the number of extracted pixel signals decreases, that is, as the range calculated by Formula (2) becomes smaller. For example, in the case that pixel signals exceeding 80% of an image are effective, the weighting coefficients illustrated in FIG. 7 are utilized, and in the case that the number of effective pixel signals is less than or equal to 80% of the image, the number of blocks having maximum weighting coefficients is reduced, as illustrated in FIG. 11.

Figure 12:
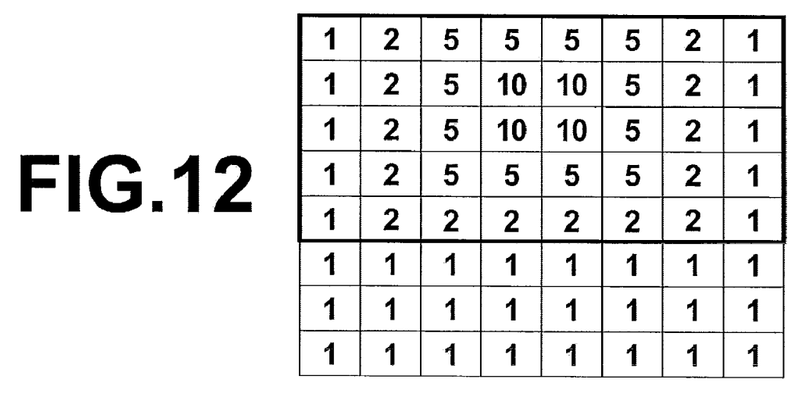
FIG. 12 is a diagram that illustrates another example of modified calculation parameters.

Alternatively, in the case that the positions of pixels corresponding to extracted pixel signals, that is, the calculated range, are shifted form the center of the image, the weighting coefficients for each block are changed such that maximal weighting coefficients are set in blocks within the calculated range, as illustrated in FIG. 12.

Figure 11:
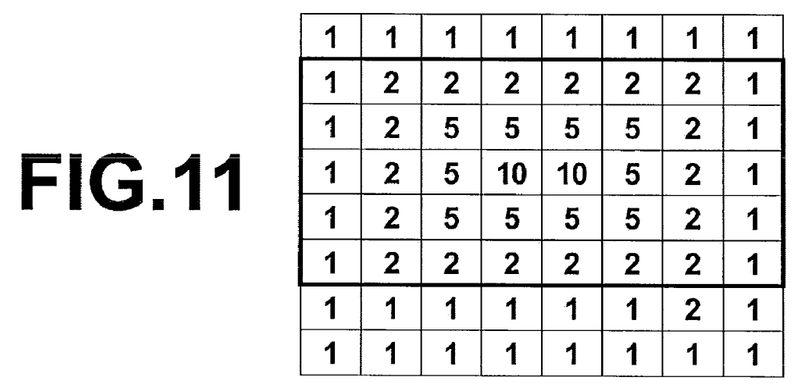
FIG. 11 is a diagram that illustrates an example of modified calculation parameters.

The weighting coefficients may be changed by combining the changes illustrated in FIG. 11 and the changes illustrated in FIG. 12. In addition, the parameter to be changed is not limited to the weighting coefficients, and other parameters may be changed. The parameters which are adjusted in step S209 are stored in the internal memory 48.

Figure 13:
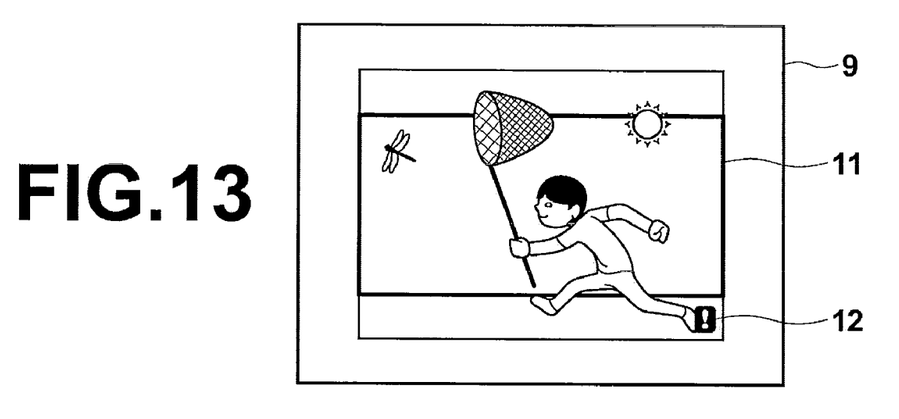
FIG. 13 is a diagram that illustrates an example of display of a frame and a warning icon.

In the present embodiment, a frame 11 that indicates the calculated range is displayed in step S204 as a marker that indicates pixels corresponding to extracted pixel signals on the monitor 9 along with the third preliminary image, as illustrated in FIG. 13.

Specifically, the flash emitting amount calculating section 53 combines an image of the frame 11 with the third preliminary image which is read out from the frame memory 49, and outputs the combined image to the monitor 9 via the display control section 50. Not that the image processing section 47 may combine the images. The frame 11 may be displayed regardless of the range, or displayed only in cases in which Lmin>1 or Lmax<N.

In addition, the flash emission amount calculating section 53 outputs a warning to the user via the CPU 42 at step S204, in the case that pixel signals which are not utilized in calculations are present, that is, when Lmin>1 or Lmax<N. That is, in the present embodiment, the flash emission amount calculating section 53 functions as both a flash emission amount calculating means and a warning output means.

An audio message which is stored in the internal memory 48 may be output to a speaker (not shown), for example. Alternatively, a warning icon 12 or a warning message may be combined with the third preliminary image read out from the frame memory 49 and output to the monitor 9 via the display control section 50. Display of the frame 11 in cases that Lmin>1 or Lmax<N may be considered to be a type of an output warning.

In the present embodiment, data regarding line numbers that specify the range to be employed in calculations and data regarding parameters to be employed in calculations, such as adjusted weighting parameters, are recorded in a predetermined region of image files as data attached to final images. For example, the data may be recorded in a region defined by a manufacturer (MakerNote) within a tag region of an Exif file.

As described above, the digital camera 1 of the present embodiment utilizes only pixel signals that received light reflected from subjects during preliminary emission when calculating the amount of flash emission during main emission. Therefore, the emission amount during main emission can be set to an appropriate value even in cases a portion of elements did not receive light reflected from subjects during preliminary emission due to the shutter speed being high.

Parameters to be employed in the calculations are adjusted based on at least one of the number of extracted pixel signals and the positions of pixels that correspond to the extracted pixel signals. Therefore, uniform calculation results can be obtained regardless of the range of extracted pixel signals. However, adjustment of calculation parameters is not absolutely necessary.

In the present embodiment, users can confirm the range of pixel signals which were utilized to calculate the flash emission amount on the monitor 9, and can also be informed that the range was limited, by the output warning. Therefore, users can adjust the shutter speed as necessary. However, main emission and actual photography may be performed without the range of pixel signals being confirmed by the user.

In the present embodiment, data that specifies ranges and data regarding calculation parameters are recorded in image files along with final images. Therefore, users can read out the data from the image files along with the images, and confirm the data. In addition, in cases that image files are transferred to a personal computer and image processes are administered thereon, the data can be utilized in the image processes. However, the data need not necessarily be recorded in the image files.

Note that methods for extracting pixel signals to be utilized in calculations, formulas for calculating flash emission amounts, parameters which are utilized in the calculations, and contents of display by the monitor other than those exemplified in the present specification are possible. Such modifications are also within the technical scope of the present invention.

What is claimed is:

1. An imaging apparatus, comprising:
    an image sensor constituted by a plurality of photoelectric converting elements which are arranged in a matrix and capable of being accessed randomly;
    control means for controlling the charge accumulation initiation timing and the charge accumulation cessation timing of the photoelectric converting elements line by line or pixel by pixel;
    image forming means for forming images employing pixel signals which are output from the photoelectric converting elements;

flash driving means for driving a flash during a set preliminary emission period and a set main emission period; and flash emission amount calculating means for extracting pixel signals from the image which has been formed by the image forming means, and for executing predetermined calculations based on the extracted pixel signals to determine a flash emission amount to be employed during the main emission period, wherein the extract pixel signals are such signals as to be output from photoelectric converting elements in which charge accumulation is initiated prior to the preliminary emission period and charge accumulation is ceased after the preliminary emission period, the flash emission amount calculating means determines the lines including pixels to be used for the calculations, based on an amount of time between initiation of charge accumulation by photoelectric converting elements in a first line and initiation of preliminary emission;

wherein the lines including pixels to be used do not include lines which begin charge accumulation after the initiation of preliminary emission or cease charge accumulation before initiation of preliminary emission, and the flash emission amount calculating means determines parameters to be employed in the predetermined calculations based on at least one of the number of extracted pixel signals and the positions of pixels that correspond to the extracted pixel signals.

2. An imaging apparatus as defined in claim 1, further comprising:
display control means for outputting the images formed by the image forming means and markers that indicate pixels that correspond to the extracted pixel signals to a predetermined screen.

3. An imaging apparatus as defined in claim 1, further comprising:
warning means for outputting a predetermined warning in the case that pixel signals which are not utilized for the predetermined calculations are present.

4. An imaging apparatus as defined in claim 1, further comprising:
means for recording the images formed by the image forming means into a predetermined recording medium, and for recording data that specifies the extracted pixel signals as data attached to the images.

5. A method for controlling flash emission of an imaging apparatus that has a flash photography function, comprising the steps of:
controlling the charge accumulation initiation timing and the charge accumulation cessation timing of photoelectric converting elements of an image sensor constituted by a plurality of photoelectric converting elements which are arranged in a matrix and capable of being accessed randomly line by line or pixel by pixel;

driving a flash during a predetermined preliminary emission period; forming an image employing pixel signals output from the photoelectric converting elements;

extracting pixel signals from the image which has been formed in the forming step, wherein the extracted pixel signals are such signals as to be output from photoelectric converting elements in which charge accumulation is initiated prior to the preliminary emission period and charge accumulation is ceased after the preliminary emission period;

executing predetermined calculations based on the extracted pixel signals to determined a flash emission amount to be employed during the main emission period;

setting the flash emission amount to the determined flash emission amount; and performing main emission of the flash at the set flash emission amount, wherein the step of extracting pixel signals comprises the step of determining the lines including pixels to be used for the calculations, based on an amount of time between initiation of charge accumulation by photoelectric converting elements in a first line and initiation of preliminary emission;

wherein the lines including pixels to be used do not include lines which begin charge accumulation after the initiation of preliminary emission or cease charge accumulation before initiation of preliminary emission; and wherein the predetermined calculations are based on at least one of the number of extracted pixel signals and the positions of pixels that correspond to the extracted pixel signals.

* * * * *